(12) United States Patent
Holcomb et al.

(10) Patent No.: US 6,511,006 B1
(45) Date of Patent: Jan. 28, 2003

(54) CONDIMENT GRINDER RESIDUE CATCH

(75) Inventors: David A. Holcomb, Seattle, WA (US); Peter A. Ryding, Seattle, WA (US)

(73) Assignee: Chef'N Corporation, Seattle, WA (US)

( * ) Notice: Subject to any disclaimer, the term of this patent is extended or adjusted under 35 U.S.C. 154(b) by 0 days.

(21) Appl. No.: 09/907,069

(22) Filed: Jul. 16, 2001

(51) Int. Cl.$^7$ ................................................. A47J 42/34
(52) U.S. Cl. ........................ 241/169; 220/264; 220/830
(58) Field of Search ............................ 99/510; 220/264, 220/334, 337, 343, 827, 830, 833; 222/135, 365, 142.1; 241/168, 169.1, 169, 262

(56) References Cited

U.S. PATENT DOCUMENTS

| 602,628 | A | 4/1898 | Powell |
| 813,649 | A | 2/1906 | Jones |
| 1,772,041 | A | 8/1930 | Harris |
| 2,683,566 | A | 7/1954 | Bentley ........................ 241/169 |
| 2,858,081 | A | 10/1958 | Sinkinson ..................... 241/168 |
| 4,135,672 | A | 1/1979 | Schlessel .................. 241/169.1 |
| 4,231,527 | A | 11/1980 | Bounds ..................... 241/169.1 |
| 4,498,608 | A | 2/1985 | Mercil ......................... 222/190 |
| 4,573,244 | A | 3/1986 | Holcomb et al. ............ 241/169 |
| 5,042,731 | A | * | 8/1991 | Ford .......................... 99/510 X |
| 5,709,346 | A | 1/1998 | Bounds et al. ............ 241/169.1 |

FOREIGN PATENT DOCUMENTS

| DE | 8306684 | 6/1983 |
| EP | 0281714 A2 | 9/1988 |
| FR | 2604348 A2 | 4/1988 |

* cited by examiner

Primary Examiner—W. Donald Bray
(74) Attorney, Agent, or Firm—Seed IP Law Group PLLC

(57) ABSTRACT

A condiment grinder is provided with a residue catch or door that closes the discharge opening of the grinder, the catch is connected to the movable handle that actuates the grinder so that the catch closes and opens in response to movement of the movable handle. The handle is connected to the residue catch through the grinding mechanism that includes a movable rasp retainer coupled to the residue catch.

5 Claims, 3 Drawing Sheets

CONDIMENT GRINDER RESIDUE CATCH

BACKGROUND OF THE INVENTION

1. Field of the Invention

This invention relates to condiment grinders and more particularly to closures for sealing off the discharge end of a grinder at the completion of a grinding operation. This invention is particularly useful for salt or pepper grinders or for any other condiment that needs to be ground.

2. Description of the Related Art

U.S. Pat. No. 4,573,244 shows a condiment grinder in which the ground condiment, pepper for example, is discharged at the bottom of the grinder. When the user is finished grinding, the user sets the grinder on the table or on a shelf. Often when the grinder is set onto the table or shelf, residual ground condiment is sticking to the bottom of the grinding mechanism and will fall onto the table or shelf. This residue then must be cleaned up.

BRIEF SUMMARY OF THE INVENTION

This invention relates to placing a closing device on the bottom of the grinder to seal off the grinder discharge when the user is finished grinding. The closure is a catch or door that is pivotally mounted to the bottom of the grinder that closes automatically when the last actuation of the grinding mechanism of the grinder is completed.

DETAILED DESCRIPTION OF THE INVENTION

Figure 1:
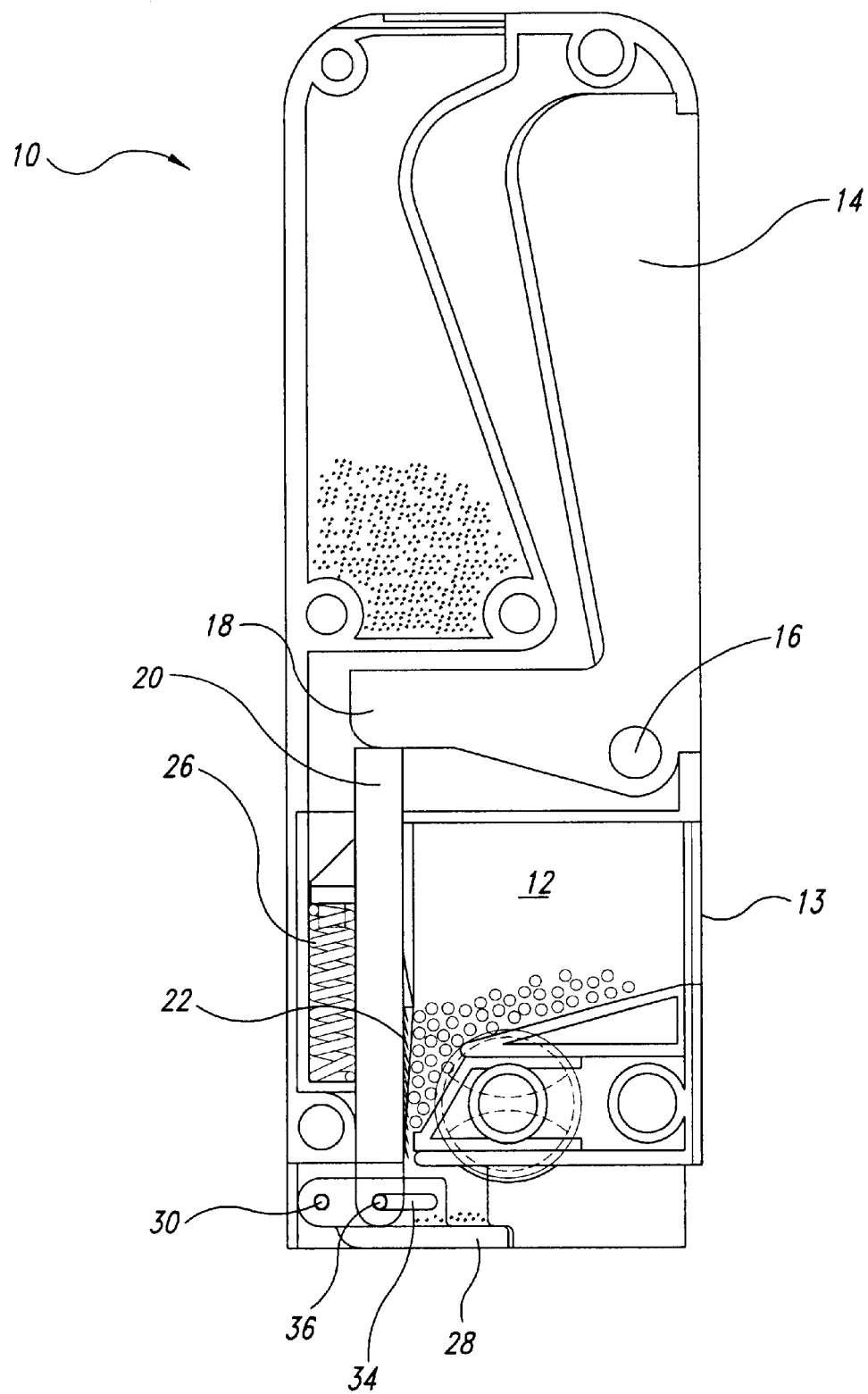
FIG. 1 is a longitudinal section of a typical grinder showing the inventive residue catch in the closed position.
Figure 2:
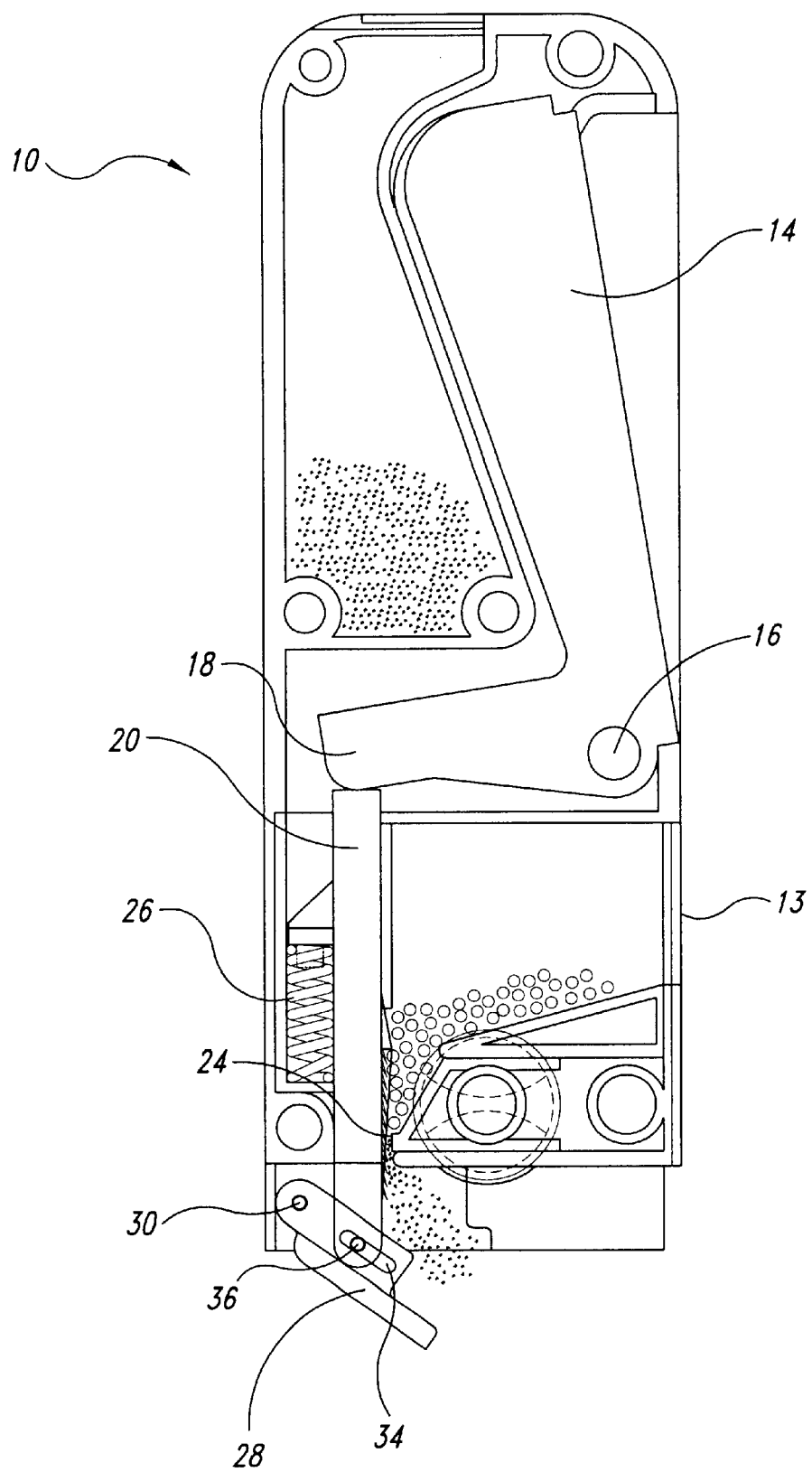
FIG. 2 is a longitudinal section of the grinder showing the catch open.
Figure 3:
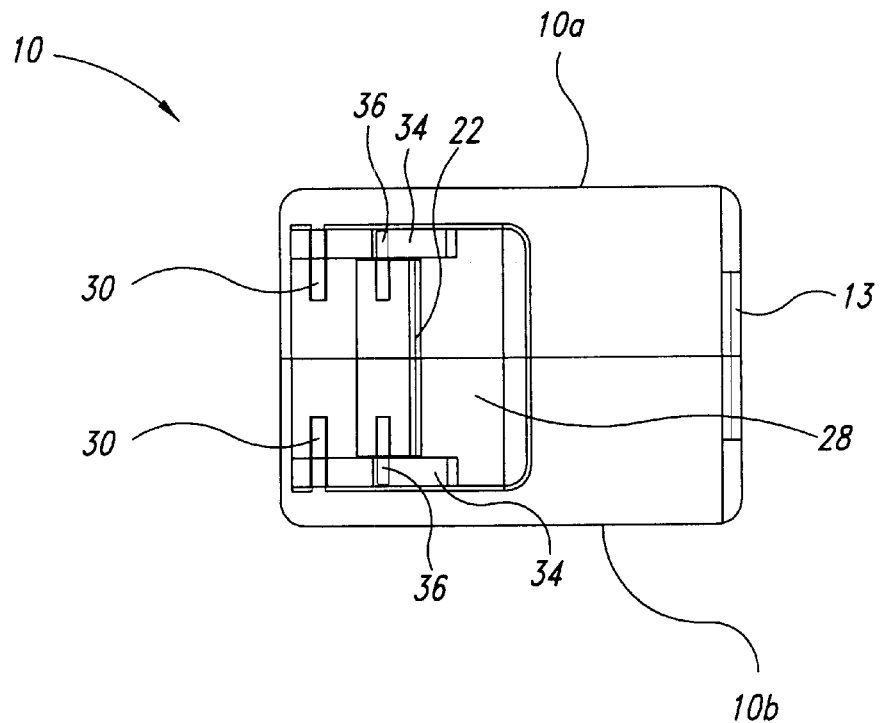
FIG. 3 is a bottom view of the grinder in FIG. 1.
Figure 4:
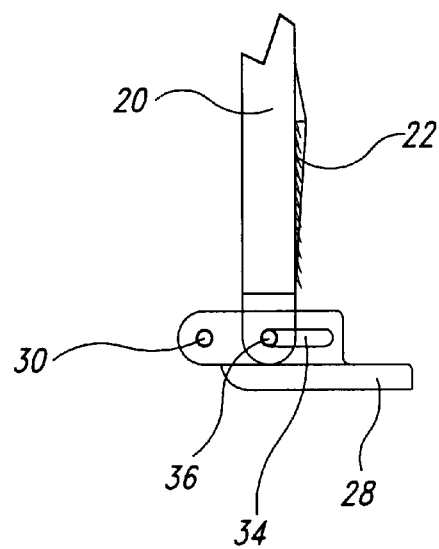
FIG. 4 is a fragmentary side elevation of the grinder showing the catch or door that seals the grinder discharge opening to prevent the residue from falling out of the grinder.

As best shown in FIGS. 1 and 2 a typical condiment grinder for pepper, salt, seeds, etc. has a housing 10 formed of two halves 10a and 10b and has a condiment compartment 12. Condiment to be ground, for example peppercorns, are placed into the compartment through side door 13 [FIG. 3]. The basic grinder shown in the drawings is of the type shown in U.S. Pat. No. 4,573,244 but other types of grinders that have a handle or triggering device to actuate the grinding mechanism and have the same residue dropping condition can also be used. For example, design Pat. No. 370,160, issued May 28, 1996 shows a spherical grinder. Patent application Ser. No. 09/656,498, filed Sep. 7, 2000, shows a dual compartment grinder and all of these can be used with a residue catch of this invention. In the case of the dual condiment grinder two residue catches would be employed. The disclosures of these patents and pending application are also incorporated herein by reference thereto.

A handle or trigger 14 pivots about a pin 16 and an end 18 of the handle pushes against a rasp retainer 20 having a metal rasp 22. Downward movement of the rasp retainer grinds the peppercorns against a shear block 24 to produce ground pepper or other ground condiment. The ground condiment falls out of the discharge opening between the rasp and the shear block. When the user squeezes the handle 14, the rasp is pushed down. When the handle is released, a spring 26 pushes the handle back into the extended initial position.

When the handle is released and the grinder is placed on a surface, residue grind often falls from the rasp or shear block through the discharge opening there between and falls onto the supporting surface. As best shown in FIG. 2 a catch or door 28 is pivotally connected to the end of the housing by a pivot pin 30 fixed into the housing. The door has a set of slots 34 on either side of the door. Pins 36 are attached to opposite sides of the rasp retainer and these pins fit into the slots 34. As best shown in FIGS. 1 and 2, the door is pivoted downwardly to open when the rasp retainer is lowered by the handle 14, the pins 36 siding along the slots 34. When the handle is released, the spring 26 raises the rasp retainer, which causes the pins to slide up in the slots, thus raising the door to a closed position. As best shown in the bottom view of FIG. 3, the closed door seals the entire area of the discharge opening of the grinder when in the closed position.

The residue catch is assembled by fitting pins 36 through slots 34 in door 28 into holes in rasp retainer 20. The two halves 10a and 10b of the housing are then fitted together encapsulating rasp retainer 20 and door 28. Pin 30 in housings 10a and 10b connects the door to the housing and acts as the door pivot point.

From the foregoing it will be appreciated that, although specific embodiments of the invention have been described herein for purposes of illustration, various modifications may be made without deviating from the spirit and scope of the invention. For example, other types of grinders can be provided with an automatically closing residue catch actuated by the actuating handle or trigger. Accordingly, the invention is not limited except as by the appended claims.

What is claimed is:

1. A condiment grinder comprising a housing having a compartment for holding the condiment to be ground;

a grinding mechanism for grinding the condiment, the grinding mechanism having a discharge opening from which residue to fall; and a residue catch fastened to the housing to cover the discharge opening, the residue catch being movable from an open position for allowing ground condiment to fall from the housing to a closed position, which closes the discharge opening preventing the ground condiment from falling from the housing;

said housing including a movable handle for actuating the grinding mechanism, and wherein movement of the residue catch between its open and closed positions is responsive to movement of the movable handle.

2. The grinder of claim 1, wherein the grinding mechanism includes a reciprocally mounted rasp retainer and wherein movement of the handle moves the rasp retainer to cause the residue catch to move between its open position and its closed position.

3. The grinder of claim 2, wherein the residue catch is a pivotally mounted door, pivoted to the housing and having slots, said rasp retainer having pins that fit into the slots, and wherein reciprocal movement of the rasp retainer pivots the door between the open and closed positions.

4. A condiment grinder comprising a housing having a compartment for holding the condiment to be ground;

a grinding mechanism for grinding the condiment, the grinding mechanism having a discharge opening from which residue can fall;

a residue catch pivotally fastened to the housing to cover the discharge opening, the residue catch being movable from an open position for allowing ground condiment to fall from the housing to a closed position which closes the discharge opening preventing the ground condiment from falling from the housing; said housing including a movable handle, and wherein movement of the residue catch between its open and closed positions is responsive to movement of the movable handle.

5. The grinder of claim 4, wherein the grinding mechanism includes a reciprocally mounted rasp retainer engageable by the movable handle and wherein movement of the handle moves the rasp retainer to cause the residue catch to move between its open position and its closed position, wherein the residue catch is a pivotally mounted door, pivoted to the housing and having slots, said rasp retainer having pins that fit into the slots, and wherein reciprocal movement of the rasp retainer moves the pins in the slots to pivot the door between the open and closed positions.

* * * * *